United States Patent
Che

(10) Patent No.: US 7,648,620 B2
(45) Date of Patent: Jan. 19, 2010

(54) METHOD FOR MANUFACTURING A MASTER DISK FOR MAGNETIC TRANSFER

(75) Inventor: Yanlong Che, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 664 days.

(21) Appl. No.: 11/391,418

(22) Filed: Mar. 29, 2006

(65) Prior Publication Data
US 2006/0219561 A1   Oct. 5, 2006

(30) Foreign Application Priority Data
Mar. 29, 2005   (JP)   .............................. 2005-094276

(51) Int. Cl.
   *C25D 1/00*   (2006.01)
   *B29D 17/00*   (2006.01)
(52) U.S. Cl. .............................. 205/68; 205/67; 205/78
(58) Field of Classification Search .............. 205/67–79
   See application file for complete search history.

(56) References Cited

U.S. PATENT DOCUMENTS

| | | | | |
|---|---|---|---|---|
| 3,904,488 A | * | 9/1975 | Nosker et al. | ................. 205/68 |
| 4,341,613 A | * | 7/1982 | Prusak et al. | ................ 204/281 |
| 4,401,521 A | * | 8/1983 | Ohmura et al. | ............... 205/78 |
| 6,759,183 B2 | | 7/2004 | Nagao et al. | |
| 2001/0028964 A1 | | 10/2001 | Nagao et al. | |
| 2005/0045481 A1 | * | 3/2005 | Kawaguchi et al. | ........... 205/67 |

FOREIGN PATENT DOCUMENTS

JP   2001-256644 A   9/2001

* cited by examiner

*Primary Examiner*—Nam X Nguyen
*Assistant Examiner*—Luan V Van
(74) *Attorney, Agent, or Firm*—Sughrue Mion, PLLC

(57) ABSTRACT

A method for manufacturing a master disk for magnetic transfer, comprising the steps of electroforming a master substrate of a metal disk with a surface on which an convexoconcave pattern corresponding to information to be transferred is transferred using a reverse die with a reversed convexoconcave pattern, and forming a magnetic layer on the convexoconcave pattern of the master substrate, the method comprising the steps of:

a conductive layer forming step to form a conductive layer with a thickness t1 on a surface of the reverse die;

an initial electroforming step to form a first plated layer with a thickness t2 equal to or more than the thickness t1 of the conductive layer by plating a surface of the conductive layer at a current density of 0.35 $A/dm^2$ or less; and a main electroforming step to form a second plated layer by plating a surface of the first plated layer at a current density of 0.35 $A/dm^2$ or more.

32 Claims, 9 Drawing Sheets

METHOD FOR MANUFACTURING A MASTER DISK FOR MAGNETIC TRANSFER

BACKGROUND OF THE INVENTION

1. Field of the Invention

The present invention relates to a method for manufacturing a master disk for magnetic transfer, in particular, a method for manufacturing a master disk for magnetic transfer which is preferable to transfer magnetic information such as format information to a magnetic disk used in a hard disk equipment and the like.

2. Description of the Related Art

Recently a magnetic disk (hard disk) used in a hard disk drive has spread rapidly, and has generally format information and address information written therein before installed in a drive after delivered to a drive manufacturer from a magnetic disk manufacturer. The writing can be executed by a magnetic head; however, it is more effective and preferable to transfer the writing in a batch from a master disk with format information and address information written therein.

In the magnetic transfer method for transferring information in a batch, a master disk and a disk to be transferred (slave disk) are in close contact with each other with a magnetic field producing device(s) such as an electromagnetic device or a permanent magnet device being provided on one surface or both surfaces of the disks to apply a magnetic field for transfer, so that information on the master disk (e.g., servo signals) is magnetically transferred to the slave disk. To achieve the magnetic transfer with high accuracy, it is critical to make a master disk and a slave disk be in close contact with each other evenly without any gap between them.

The master disk which is used for the magnetic transfer method is usually a substrate having a surface formed with an convexoconcave pattern which corresponds to information signals and the surface of the convexoconcave pattern being covered with a magnetic layer. The master disk for magnetic transfer is generally manufactured with a method including a step of laminating a metal disk which consists of an electroformed layer on an original on which an convexoconcave pattern of information is formed to electroform the original so that the convexoconcave pattern is transferred to a surface of the metal disk, a step of removing the metal disk from the original, a step of stamping the removed metal disk into a predetermined size, and a step of covering a surface of the transferred convexoconcave pattern with a magnetic layer (See Japanese Patent Application Laid-Open No. 2001-256644, for example).

SUMMARY OF THE INVENTION

However, the conventional master disk manufactured by the above steps tends to have a problem, in electroforming, with an insufficient geometrical transfer of an convexoconcave pattern on an original. Specifically, an convexoconcave pattern on an original is not thoroughly covered with a metal and the transferred convexoconcave pattern has a deficient geometry. If electroforming is performed in a condition to avoid producing the deficient geometry in a transferred convexoconcave pattern, the electroforming requires a longer time, which goes against economic rationality.

If a master disk with a deficient geometry and a slave disk are brought in close contact with each other without any gap between them for magnetic transfer, it is extremely difficult to transfer signals with high quality.

In addition, in electroforming, an electroformed layer is likely subject to internal stress, and the master disk is not completely flat but has warp or distortion, for example because of deformation which is caused in machining in a releasing step to release the metal disk from the original or a stamping step to stamp the metal disk into a predetermined size.

If such a master disk and a slave disk are brought in close contact with each other without any gap between them, the insufficient contact causes a space between the master disk and the slave disk, and due to the space, signals are transferred with low intensity, which results in a poor transfer.

The present invention is accomplished in the view of the above problems, and it is an object of the present invention to provide a master disk carrying information to be magnetically transferred, the master disk having a surface with an convexoconcave pattern thereon which allows good geometrical transfer in electroforming, being unlikely to cause internal stress in an electroformed layer, having a high degree of flatness, easy to contact closely with a slave disk which is to be transferred with the information.

To accomplish the above object, the present invention provides a method for manufacturing a master disk for magnetic transfer, including the steps of electroforming a master substrate of a metal disk with a surface on which an convexoconcave pattern corresponding to information to be transferred is transferred using a reverse die with a reversed convexoconcave pattern, and forming a magnetic layer on the convexoconcave pattern of the master substrate, the method including: a conductive layer forming step to form a conductive layer with a thickness t1 on a surface of the reverse die; an initial electroforming step to form a first plated layer with a thickness t2 equal to or more than the thickness t1 of the conductive layer by plating a surface of the conductive layer at a current density of 0.35 $A/dm^2$ or less; and a main electroforming step to form a second plated layer by plating a surface of the first plated layer at a current density of 0.35 $A/dm^2$ or more.

According to the present invention, in the initial electroforming step, a surface of a conductive layer is plated at a current density of 0.35 $A/dm^2$ or less to form a first plated layer with a thickness t2 equal to or more than the thickness t1 of the conductive layer. According to the initial electroforming step, the current density in plating is low enough for the plated layer to thoroughly cover the convexoconcave pattern on the original, which avoids producing a deficient geometry in the transferred convexoconcave pattern.

In addition, even though the current density in plating is low enough, the first plated layer is formed with a thickness t2 equal to or more than the thickness t1 of the conductive layer, which does not require a longer time and does not go against economic rationality. That is, the current density in the main electroforming step of 0.35 $A/dm^2$ or more allows the electroform rate to be maintained as in conventional methods, and does not affect productivity.

Moreover, the current density of 0.35 $A/dm^2$ or less in the initial electroforming step is unlikely to cause an internal stress in an electroformed layer, which allows the disk after electroforming to have an extremely high degree of flatness (small flatness).

In the present invention, the thickness t1 of the conductive layer is preferably 20 to 40 nm. The conductive layer having such a thickness t1 is capable to be in electrical contact which is necessary for electroforming, and shortens the time required for the initial electroforming step.

In the present invention, the thickness t2 of the first plated layer is preferably one to one-half times of the thickness t1 of the conductive layer. Forming a first plated layer having such a thickness t2 requires only a short time and does not go against economic rationality.

In the present invention, the thickness t3 of the second plated layer is preferably 100 to 300 µm. A master disk for magnetic transfer having a plated layer with such a thickness rarely causes a problem in its using.

In the present invention, the first plated layer and/or the second plated layer is preferably formed of a Ni-based metal. Electroforming such a Ni-based metal allows the process to be stable and with high geometrical transfer accuracy.

In the present invention, the conductive layer is preferably formed by sputtering. Forming such a conductive layer by sputtering is desirable in terms of both device structure and quality (e.g., a dust-free condition, a consistent film thickness).

As described above, according to the present invention, the current density in plating is low enough so that a plated layer is capable to thoroughly cover an convexoconcave pattern on an original, which avoids producing a deficient geometry in a transferred convexoconcave pattern.

DETAILED DESCRIPTION OF THE PREFERRED EMBODIMENTS

Now, a method for manufacturing a master disk for magnetic transfer according to a preferred embodiment of the present invention will be explained in detail by reference to the accompanying drawings.

Figure 1:
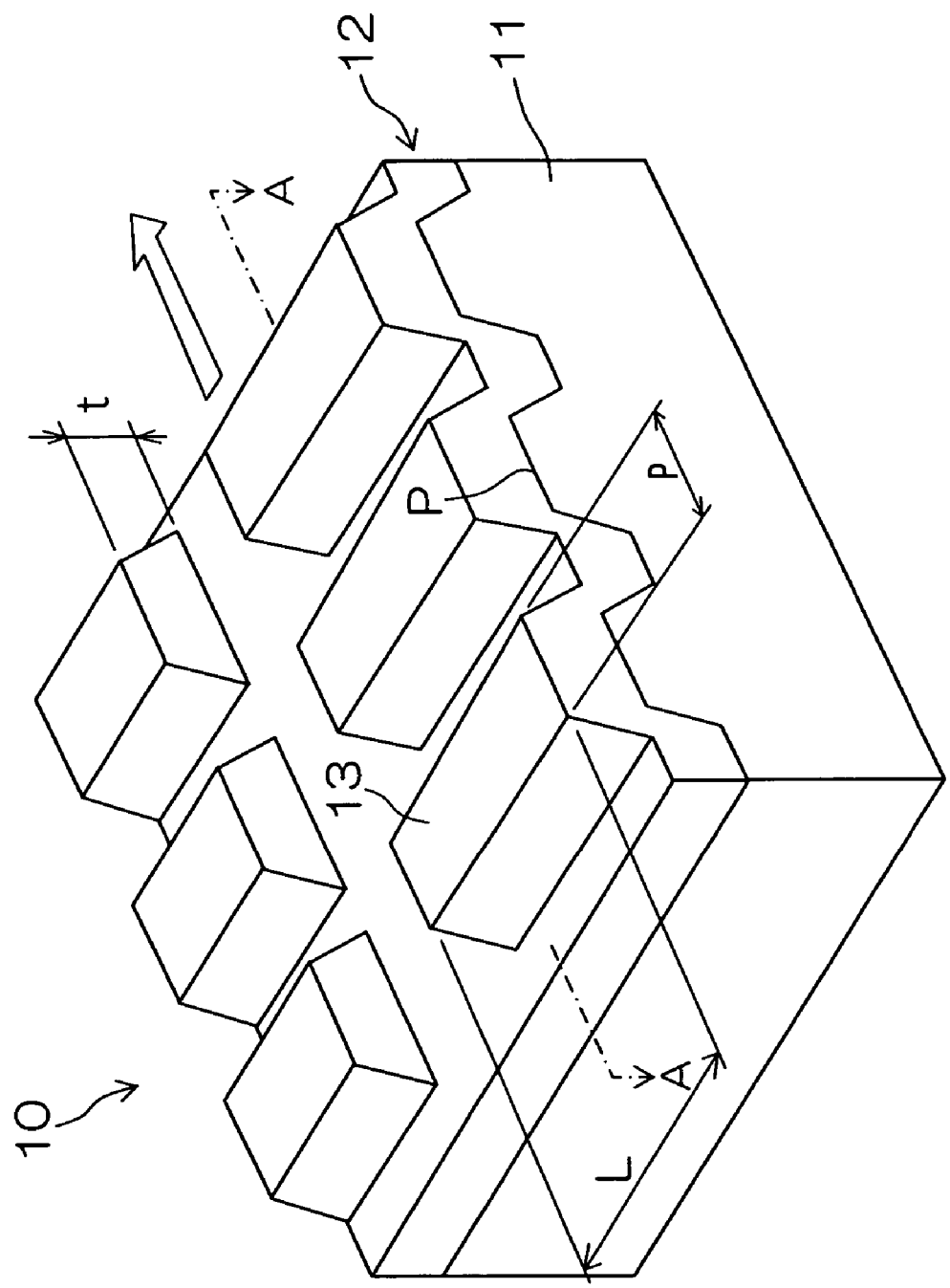
FIG. 1 is a partial perspective view to show a master disk according to the present invention.
Figure 2:
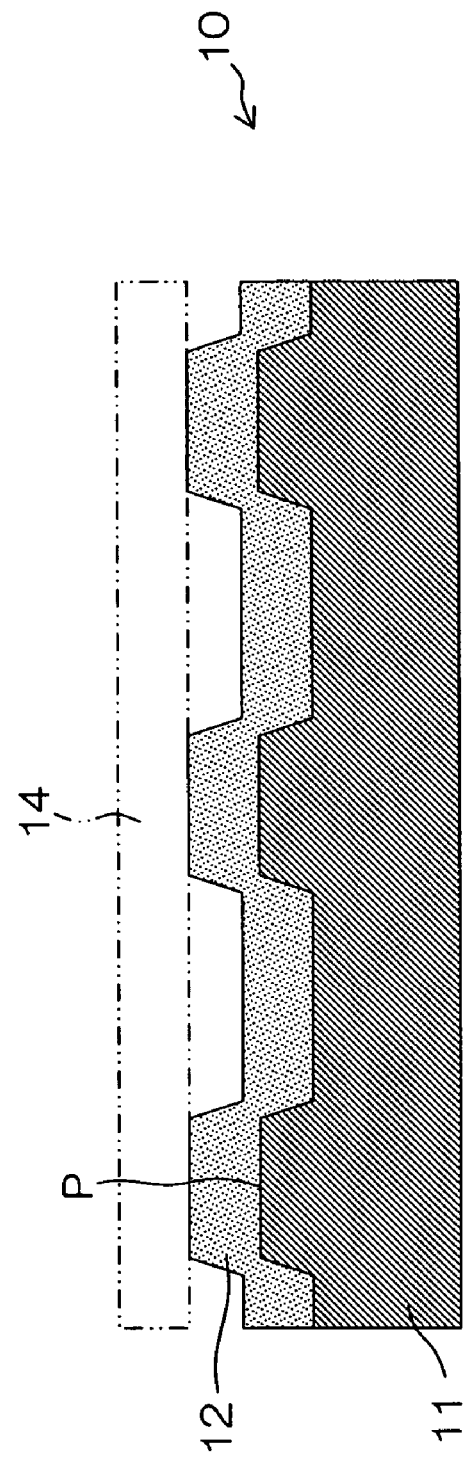
FIG. 2 is a cross sectional view taken along the line A-A of FIG. 1.

FIG. 1 is a partial perspective view to show a master disk 10 for magnetic transfer according to the present invention (hereinafter, referenced to as a master disk 10), while FIG. 2 is a cross sectional view taken along the line A-A of FIG. 1 to show a disk to be transferred with (slave disk 14) information in an imaginary line.

As shown in FIG. 1 and FIG. 2, the master disk 10 includes a metallic master substrate 11 and a magnetic layer 12, and the master substrate 11 has a surface with a fine convexoconcave pattern P (such as a servo information pattern) which corresponds to information to be transferred, and the convexoconcave pattern P is covered with a magnetic layer 12.

This structure provides information carrying surface 13 having a fine convexoconcave pattern P covered with the magnetic layer 12 on one side of the master substrate 11. As seen from FIG. 1, the fine convexoconcave pattern P is rectangular in a plan view with a length p in a track direction (the direction of an arrow in FIG. 1) and a length L in a radial direction after the magnetic layer 12 is formed.

The optimum values for the length p and the length L depend on a recording density or waveforms of record signals, and may be 80 nm for the length p and 200 nm for the length L. For servo signals, the fine convexoconcave pattern P is formed with a longer length in a radial direction than in a track direction, and for example, preferably the radial length L is 0.05 to 20 µm and the length p in a track direction (circumferential direction) is 0.01 to 5 µm.

An convexoconcave pattern P with a longer length in a radial direction within the above range is preferably selected for a pattern to carry servo signals. The convexoconcave pattern P has a depth t (the height of projections) of preferably 30 to 800 nm, more preferably 50 to 300 nm.

Figure 3:
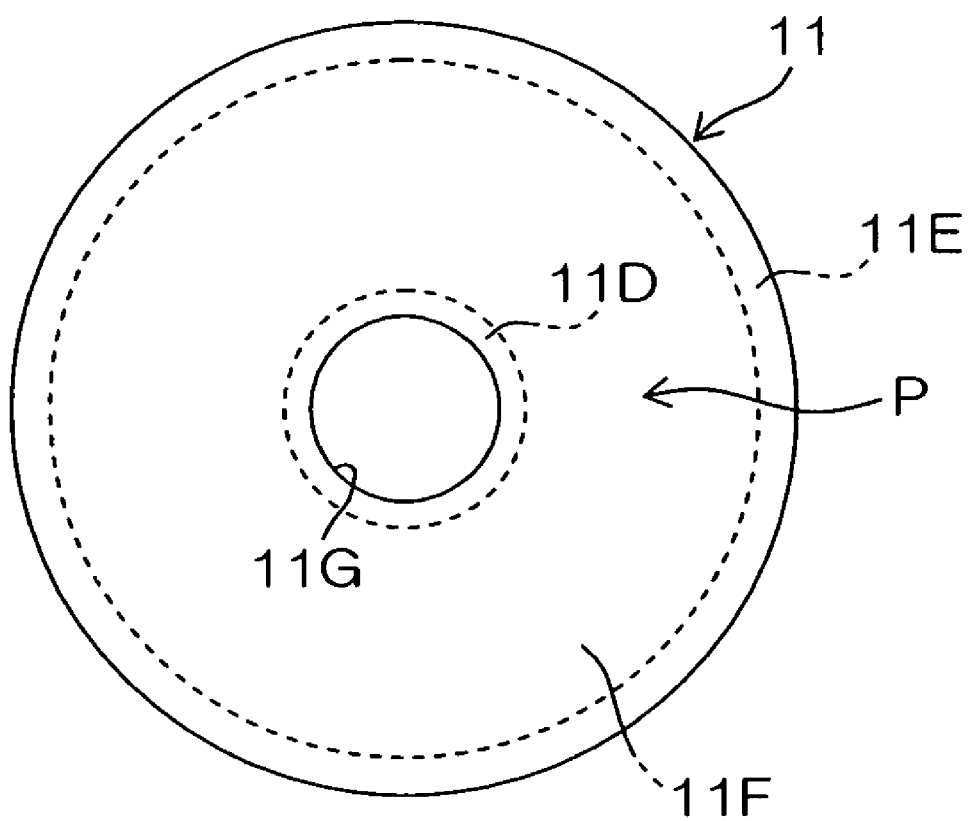
FIG. 3 is a plan view of a master substrate.

The master substrate 11 is made by electroforming, and as shown in FIG. 3, is formed into a circular shape with a central hole 11G, having a surface (information carrying surface 13) consisting of an inner peripheral portion 11D, an outer peripheral portion 11E, and a ring shape region 11F on which the convexoconcave pattern P is formed. A method to manufacture the master substrate 11, which will be explained in detail below, generally includes a step of electroforming an original having an convexoconcave pattern P of information to form a metal disk consisting of an electroformed layer on the original so that the convexoconcave pattern P is transferred to the metal disk, and a step of releasing the metal disk from the original.

In the present invention, the electroformed layer may be of any metal or alloy, and in the embodiment, a Ni electroformed layer is used as a preferable example. The Ni electroformed layer is electroformed with a controlled current density to have a predetermined crystal structure to provide flexibility. The current densities in electroforming will be explained below.

Now, a method for manufacturing a master disk 10 with the above configuration according to the present invention will be explained in detail below.

FIG. 4 is a process view to show the steps to manufacture a master disk 10. First, as shown in FIG. 4A, a master plate 15 (such as a glass plate, or a quartz plate) which has a smooth and clean surface of a silicone wafer is subjected to a pretreatment to form a close contact layer, electron beam resist is applied by spin coating to form a resist film 16 and the resist film 16 is baked.

Next, the master plate 15 is placed on a stage of an electron beam exposure equipment (not shown) which is equipped with a high-precision rotating stage or X-Y stage, and is irradiated with an electron beam B which is modulated in response to servo signals and the like to expose a desired convexoconcave pattern P' onto the resist film 16.

Figure 4A:
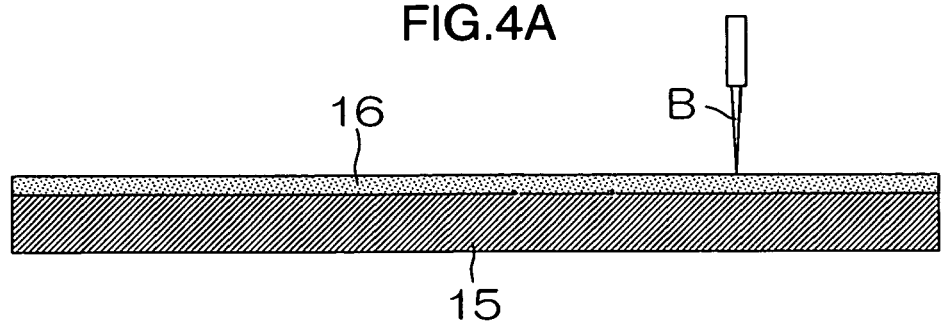
FIG. 4A to FIG. 4E are process views to show a method to manufacture a master disk of one embodiment according to the present invention.
Figure 4B:
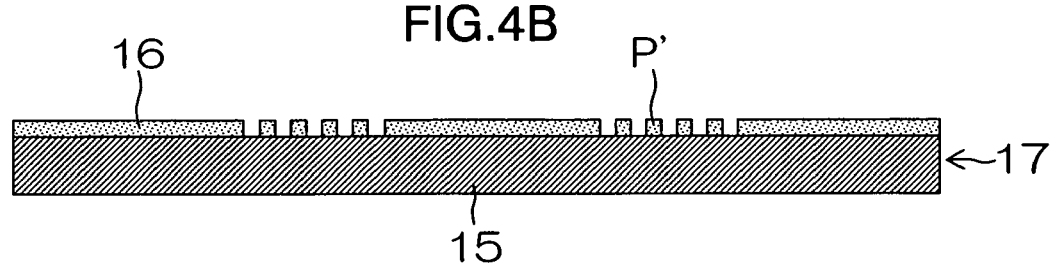

As shown in FIG. 4B, after a developing process of the resist film 16 to remove the exposed portion, the remained portion of the resist film 16 provides the desired convexoconcave pattern P'.

Then, on the convexoconcave pattern P' is formed a Ni conductive film (not shown), that is a conductive layer, by sputtering to produce an original 17 which can be electroformed (a conductive layer forming step). The Ni conductive film preferably has a thickness t1 (not shown due to the thinness) of 20 to 40 nm. The conductive layer having such a thickness t1 is capable to be in electrical contact which is necessary for electroforming, and shortens the time required for an initial electroforming step which will be explained below.

The conductive layer may be made of metals other than Ni, such as Al and Au. The conductive layer may be made with a film forming technique other than sputtering, such as PVD (physical vapor deposition), CVD (chemical vapor deposition), electroless plating, or the like.

Figure 4C:
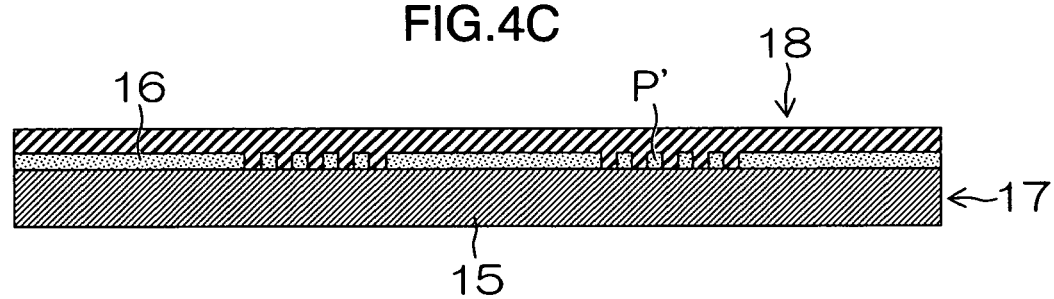
Figure 4D:
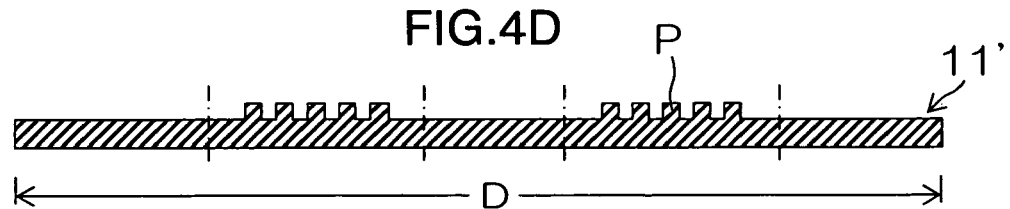

Next, as shown in FIG. 4C, the entire surface of the original 17 is electroformed by an electroforming device to laminate a metal disk 18 (Ni electroformed layer) of Ni metal having a desired thickness. The Ni metal disk which has a crystal structure of face centered cubic lattice is electroformed at a controlled current density to provide a predetermined crystal structure.

Figure 5:
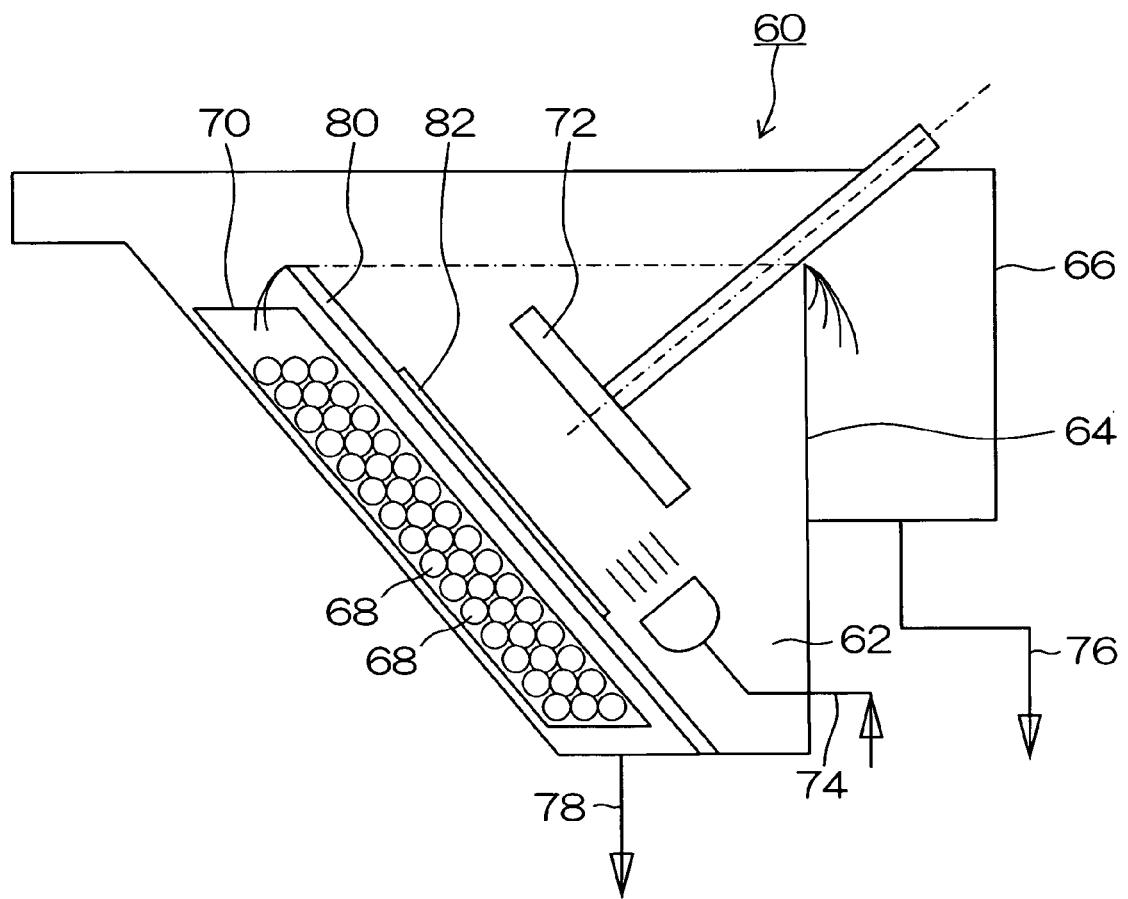
FIG. 5 is a cross sectional view to show an electroforming device.

FIG. 5 shows a cross sectional view of an electroforming device 60. The electroforming device 60 includes a reservoir 64 to reserve plating liquid (bath) 62, a drain tank 66 to receive the plating liquid 62 which overflowed from the reservoir 64, an anode chamber 70 filled with a plurality of Ni pellets 68 which function as an anode, the chamber is to receive the plating liquid which overflowed from the reservoir 64, and a cathode 72 which holds the original 17.

The plating liquid 62 is arranged to be supplied to the reservoir 64 via a plating liquid supply tubing 74. The plating liquid 62 which overflowed from reservoir 64 to the drain tank 66 is arranged to be recovered by a drain tank drain tubing 76. The plating liquid 62 which overflowed from reservoir 64 to the anode chamber 70 is arranged to be recovered by an anode chamber drain tubing 78.

The reservoir 64 and the anode chamber 70 are separated by a partition plate 80 from each other. The partition plate 80 has a surface toward the reservoir 64 where an electrode barrier 82 is fixed in a direction facing to the cathode 72. The electrode barrier 82 is formed to cover a predetermined part of an electrode so that an electroformed film has a uniform in-plane thickness.

In the electroforming device 60 with the above configuration, the master substrate 11 is electroformed with the original 17 being held by the cathode 72 and the cathode 72 connected to a negative electrode and the anode chamber 70 connected to a positive electrode being turned on.

Figure 6:
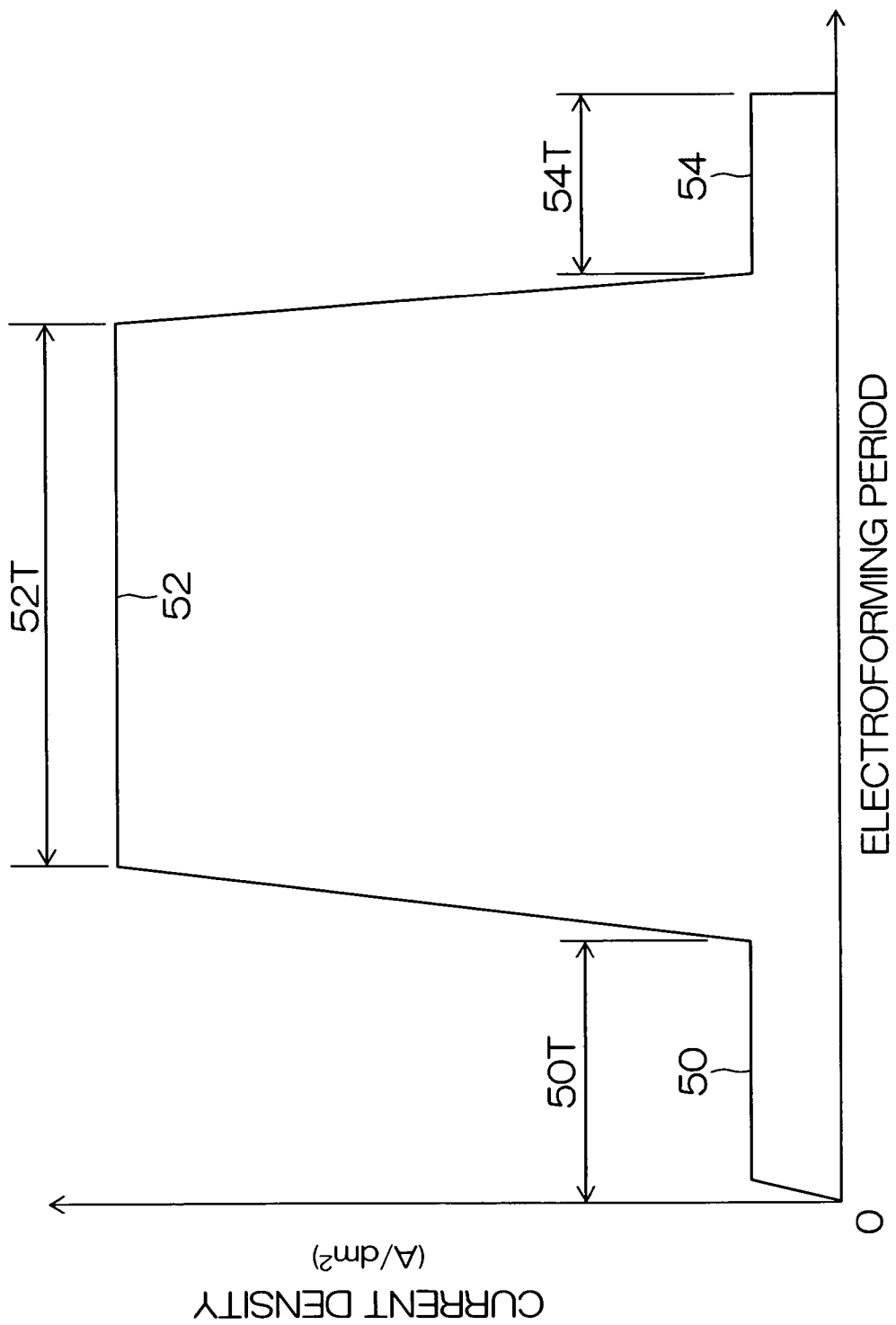
FIG. 6 is a graph to show a current density pattern in electroforming.

In the electroforming, in the embodiment, the current density is controlled in a pattern shown in FIG. 6. That is, the electroforming step is divided into three or more periods of time: including an initial electroforming step 50 for electroforming (plating) at a current density of 0.35 A/dm$^2$ or less for a predetermined period from the starting time; a main electroforming step 52 for electroforming at a current density of 0.35 A/dm$^2$ or more for a predetermined period after the initial electroforming step; and a final electroforming step 54 for electroforming (plating) at a current density of 5.2 A/dm$^2$ is less for a or FIG. 6 is an X-Y graph where the horizontal axis is time and the vertical axis predetermined period to the end. period 52T for the main electroforming step 52, and the period 54T for the final electroforming step 54.

The period 50T for the initial electroforming step 50 is set to make the first plated layer which is formed in this step have a thickness t2 equal to or more than a thickness t1 of the conductive layer. Preferably, the first plated layer is arranged to have a thickness t2 which is one to one-half times of a thickness t1 of the conductive layer. Forming a first plated layer with such a thickness t2 requires only a short time and does not go against economic rationality.

The current density in the main electroforming step 52, as described above, needs to be 0.35 A/dm$^2$ or more, preferably 15.3 A/dm$^2$ or more for electroforming. The second plated layer which is formed in the main electroforming step 52 preferably has a thickness t3 of 100 to 300 μm. A master disk for magnetic transfer having a plated layer with such a thickness rarely causes a problem in its using.

The current density in the final electroforming step 54 is preferably 5.2 A/dm$^2$ or less, more preferably 3.5 A/dm$^2$ or less. In the final electroforming step 54, controlling the current density in this way allows a surface roughness of the disk after electroforming to be maintained with high accuracy (with small surface roughness).

In the period 54T for the final electroforming step 54 is preferably set to make the third plated layer which is formed in final electroforming step 54 have a thickness t4 of 3.4 to 12 μm. Forming a third plated layer with such a thickness t4 requires only a short time and does not go against economic rationality.

According to the present invention, the plating in an initial electroforming step is performed with a current density low enough for the plated layer to thoroughly cover an convexoconcave pattern on an original, which avoids producing a deficient geometry in the transferred convexoconcave pattern.

While, even though the current density in plating is low enough, the first plated layer is formed with a thickness t2 equal to or more than the thickness t1 of the conductive layer, which does not require a long time and does not go against economic rationality. That is, the electroforming in the main electroforming step is performed at a current density of 0.35 A/dm$^2$ or more, which allows the electroforming rate to be maintained as in conventional methods, and does not affect productivity.

The current density of 0.35 A/dm$^2$ or less in the initial electroforming step for electroforming is unlikely to cause an internal stress in an electroformed layer, which allows the flatness of the disk after electroforming to be maintained with high accuracy (with small flatness).

Moreover, controlling the current densities and the periods for each electroforming steps makes an internal stress unlikely be caused in the electroformed layer, and allows the flatness of the disk after electroforming to be maintained with high accuracy (with small flatness). The controlling also allows a surface roughness of the disk after electroforming to be maintained with high accuracy (with small surface roughness). The controlling further allows the electroforming rate to be maintained as in conventional methods, and does not affect productivity.

Turning back to FIG. 4, the metal disk 18 having a predetermined crystal structure as described above is released from the original 17 and the remained resist film 16 is removed and cleaned. This provides the original disk 11' of a master substrate 11, as shown FIG. 4D, which has a reversed convexoconcave pattern P, and has an outer diameter D before a stamping into a predetermined size.

Figure 4E:
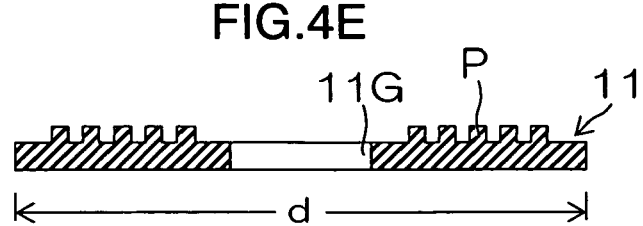

The original disk 11' is then stamped into the predetermined size, which provides a master substrate 11 with the outer diameter d in FIG. 4E. To manufacture a master disk 10, a magnetic layer 12 is formed on the convexoconcave pattern surface of the master substrate 11.

Alternatively, the original 17 is electroformed to make a second original to manufacture a master disk 10. The second original may be used for electroforming to produce a metal disk with a reversed convexoconcave pattern, and the metal disk is stamped into a predetermined size, which provides a master substrate.

Further alternatively, the second original may be electroformed, or a liquid resin may be pressed against the second original to be cured to produce a third original, and the third original may be electroformed to produce a metal disk with a reversed convexoconcave pattern, which is then released from the third original to provide a master substrate. The second original or the third original may be used repeatedly to produce a plurality of metal disks 18.

In producing an original, a resist film may be etched to form an convexoconcave pattern by etching on a surface of the original after the exposing and developing processes to the resist film, and then the resist film may be removed.

A magnetic layer 12 is formed of a magnetic material by a vacuum metallizing technique such as vacuum deposition, sputtering and ion-plating, plating, or coating. The magnetic material for a magnetic layer may be Co, Co alloy (e.g., CoNi, CoNiZr, CoNbTaZr), Fe, Fe alloy (e.g., FeCo, FeCoNi, FeNiMo, FeAlSi, FeAl, FeTaN), Ni, or Ni alloy (e.g., NiFe). In particular, FeCo and FeCoNi are preferable. The magnetic layer 12 has a thickness of preferably 50 to 500 nm, more preferably 100 to 400 nm.

The magnetic layer 12 is preferably provided with a protecting film such as a diamond like carbon (DLC) or a sputtered carbon thereon, and further, the protecting film may be provided with a lubricant layer thereon. In this case, a preferable configuration includes a DLC protecting film having a thickness of 3 to 30 nm and a lubricant layer.

Between the magnetic layer and the protecting film may be provided with a close contact enhancing layer such as Si. The lubricant layer functions to improve the durability deterioration of the magnetic layer 12 due to damages caused by friction with a slave disk 14 in correcting contact misalignments between the magnetic layer 12 and the slave disk 14.

According to the present invention, to laminate a metal disk 18 by the electroforming process, a Ni electroformed layer which causes an extremely small residual stress is formed by controlling both a current density and periods of time.

Usually, nickel (Ni) is the metal used for the master disk 10, and, when the master disk 10 is produced by electroforming, a nickel sulfamate bath is preferably used since a master substrate 11 is easily formed in it with a small stress.

The nickel sulfamate bath is a mixture, for example, the main constituents of which are nickel sulfamate 400 to 800 g/L and boric acid 20 to 50 g/L (supersaturation), with additives such as a surfactant (e.g., sodium lauryl sulfate) being added as needed. The bath temperature of the nickel sulfamate bath is preferably 40 to 60 degrees C. In electroforming, nickel plated balls in a titanium coated case are preferably used as a counter electrode.

Figure 7:
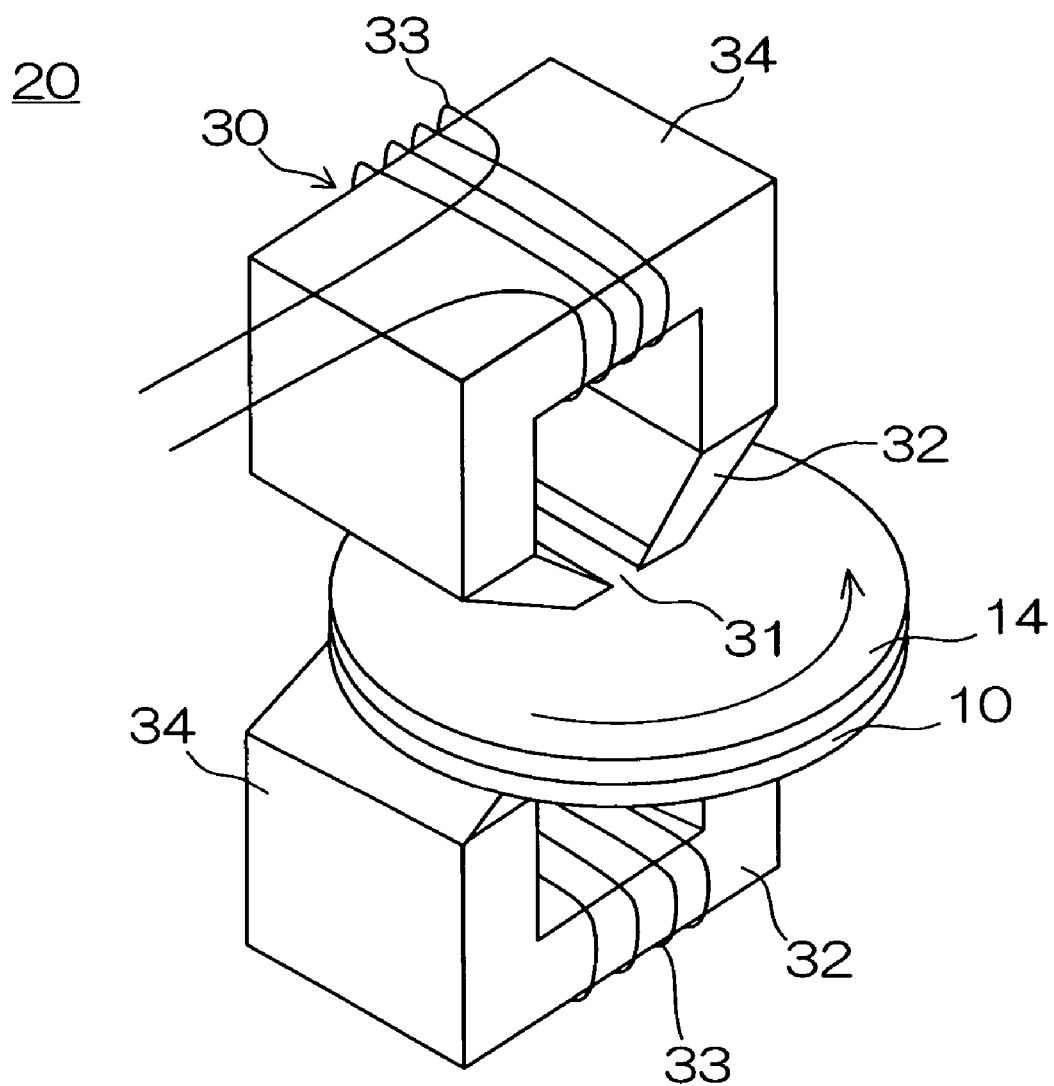
FIG. 7 is a perspective view to show the main parts of a magnetic transfer device.

Now, a method for magnetically transferring the convexoconcave pattern P on the master disk 10 produced as the above described to a slave disk 14 will be explained below. FIG. 7 is a perspective view to show the main parts of a magnetic transfer device 20 for magnetic transfer by using the master disk 10 according to the present invention.

In the magnetic transfer, a slave surface (magnetic recording surface) of the slave disk 14 after initial DC magnetization of FIG. 9A which will be explained below is contacted with an information carrying surface 13 of the master disk 10, and a predetermined pressure is applied to make the disks be in close contact with each other. Then, to the slave disk 14 and the master disk 10 which are in close contact with each other, a magnetic field for transfer is applied by a magnetic field producing device 30 to transfer the convexoconcave pattern P on the master disk 10 to the slave disk 14.

The slave disk 14 is a circular shaped recording medium such as a hard disk or flexible disk with a magnetic recording layer formed on one surface or both surfaces thereof, and is subjected to a cleaning process (such as burnishing) to remove tiny projections on the surfaces and adhered dust by a glide head, a burnisher, and the like before being in close contact with the master disk 10 as needed.

The magnetic recording layer of the slave disk 14 may be a coating type magnetic recording layer, a plating type magnetic recording layer, or a thin metal film type magnetic recording layer. The magnetic material for the thin metal film type magnetic recording layer may be Co, Co alloy (e.g., CoPtCr, CoCr, CoPtCrTa, CoPtCrNbTa, CoCrB, CoNi), Fe, Fe alloy (e.g., FeCo, FePt, FeCoNi), Ni, or Ni alloy (e.g., NiFe).

The above materials are preferable since the transfer with these materials is performed clearly due to their high magnetic flux density and magnetic anisotropy in the same direction with a direction to which a magnetic field is applied (an in-plane direction for in-plane recording). A non-magnetic underlying layer is preferably provided to give a necessary magnetic anisotropy to the underside (a side toward a supporting body) of the magnetic material. The underlying layer needs to have a crystal structure and a lattice constant in accordance with the magnetic layer 12. Thus, the underlying layer is preferably formed of Cr, CrTi, CoCr, CrTa, CrMo, NiAl, or Ru.

There are two ways to perform a magnetic transfer with the master disk 10; one is performed by contacting one master disk 10 closely to one side of a slave disk 14 for one-side transfer, and the other is performed by contacting a pair of master disks 10 closely to both sides of a slave disk 14 for both-side transfer (not shown).

Figure 8:
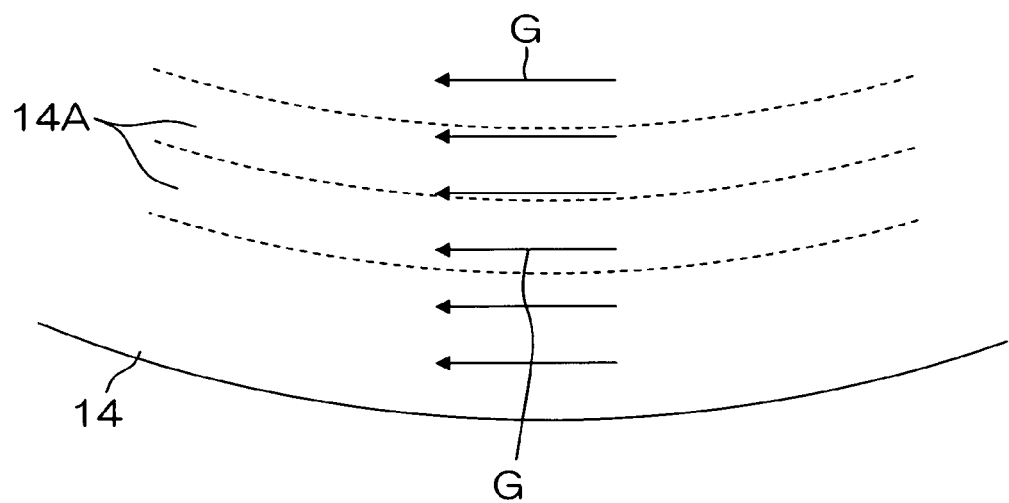
FIG. 8 is a plan view to show a method to apply a magnetic field for transfer.

A magnetic field producing device 30 to apply a magnetic field for transfer includes two electromagnet devices 34 which are arranged on the upper and lower sides thereof, each electromagnet device has a core 32 with a gap 31 extending in a radial direction of the slave disk 14 and the master disk 10 which are held in close contact, and a coil 33 is wound around the core 32. The upper and lower electromagnet devices 34 apply a magnetic field for transfer which has lines of magnetic force G parallel to a track direction (see FIG. 8). FIG. 8 shows a relation between the circumferential tracks 14A and the lines of magnetic force G.

In applying a magnetic field, the magnetic field producing device 30 applies a magnetic field for transfer to the slave disk 14 and the master disk 10 with the slave disk 14 and the master disk 10 being integrally rotated, to magnetically transfer the convexoconcave pattern on the master disk 10 to the slave surface of the slave disk 14. Alternatively, the magnetic field producing device may be rotated instead of the disks.

The application of a magnetic field for transfer produces a magnetic field at a portion in a track direction, in which no magnet field strength is over the maximum of the magnet field strength range for optimum transfer (0.6 to 1.3 times of the coercive force Hc of the slave disk 14) in any track direction, and at least one magnet field strength in a track direction is in the magnet field strength range for optimum transfer, and a magnet field strength in a reversed track direction is less than a minimum in the magnet field strength range for optimum transfer at any points in the track direction.

Figure 9A:
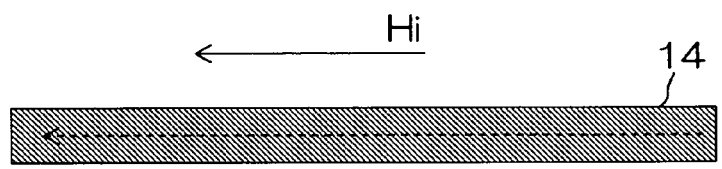
FIG. 9A to FIG. 9C are process views to show a basic process of a magnetic transfer method.
Figure 9B:
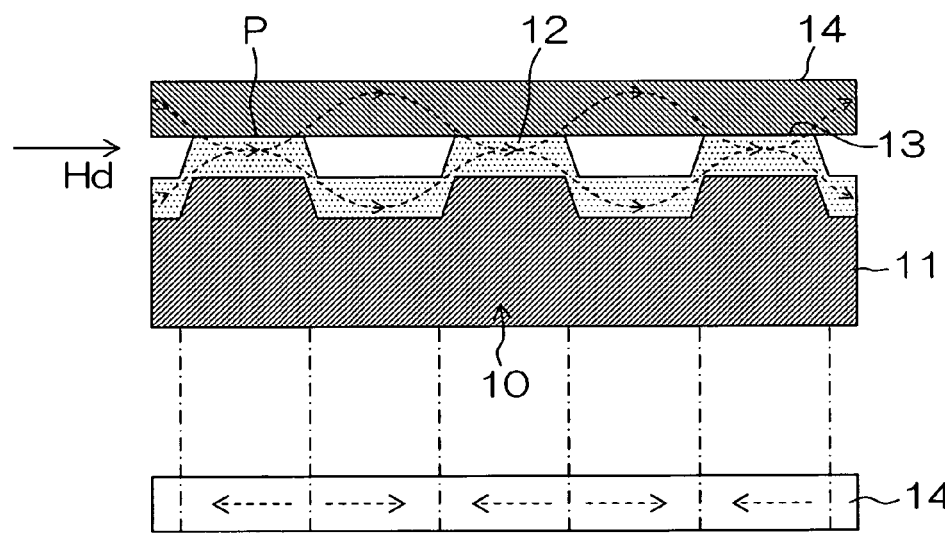
Figure 9C:
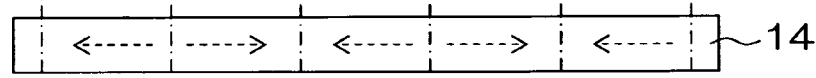

FIGS. 9A to 9C are views to explain a basic process of a magnetic transfer method by in-plane recording. First, as shown in FIG. 9A, an initial magnetic field Hi is applied in one track direction of the slave disk 14 in advance to perform the initial magnetization (direct current demagnetization).

Next, as shown in FIG. 9B, the recording surface of the slave disk 14 (magnetic recording section) and the information carrying surface 13 of the master disk 10 on which the convexoconcave pattern P is formed are brought in close contact with each other, and a magnetic field for transfer Hd is applied in a track direction of slave disk 14 which is the opposite direction for the initial magnetic field Hi to perform a magnetic transfer. Since the magnetic field for transfer Hd is absorbed into the magnetic layer 12 at convex portions of the convexoconcave pattern P, and the magnetization of the portions is not reversed and the magnetization of the remained portions is reversed, so that, as shown in FIG. 9C, the convexoconcave pattern P on the master disk 10 is magnetically transferred and recorded on the magnetic recording surface of the slave disk 14.

In the magnetic transfer, a fine close contact between the slave disk 14 and the master disk 10 is essential for a transfer with high accuracy, and such a fine contact is achieved by the master disk 10 according to the present invention which does not cause a deficient geometry in a transferred convexoconcave pattern, has a precise magnetic pattern, and is provided with a high degree of flatness.

While an embodiment of the method for manufacturing a master disk for magnetic transfer according to the present invention have been described, the present invention is not limited to the above embodiment, and various aspects may be implemented.

For example, though the whole process is divided into three periods of the initial electroforming step 50, the main electroforming step 52, and the final electroforming step 54 in the above embodiment, the whole process can be divided into four or more periods of time. A finer control by a process which is divided into many periods of time may be preferably implemented.

Also, though a back surface of the master disk 10 is not processed in the above embodiment, an aspect in which the back surface of the master disk 10 is machined to eliminate a deviation of thickness can be implemented.

Further, though the master disk 10 in the above embodiment is of an annular shape (doughnut shape) with an internal diameter, the master disk 10 may be of a circular shape without an internal diameter.

What is claimed is:

1. A method for manufacturing a master disk for magnetic transfer, comprising the steps of electroforming a master substrate of a metal disk with a surface on which an convexoconcave pattern corresponding to information to be transferred is transferred using a reverse die with a reversed convexoconcave pattern, and forming a magnetic layer on the convexoconcave pattern of the master substrate, the method comprising the steps of:

a conductive layer forming step to form a conductive layer with a thickness t1 on a surface of the reverse die;

an initial electroforming step to form a first plated layer with a thickness t2 equal to or more than the thickness t1 of the conductive layer by plating a surface of the conductive layer at a current density of 0.35 A/dm$^2$ or less;

a main electroforming step to form a second plated layer with a thickness t3 by plating a surface of the first plated layer at a current density of 15.3 A/dm$^2$ or more; and a final electroforming step to form a third plated layer by plating a surface of the second plated layer at a current density of 5.2 A/dm$^2$ or less.

2. The method for manufacturing a master disk for magnetic transfer according to claim 1, wherein the thickness t1 of the conductive layer is 20 to 40 nm.

3. The method for manufacturing a master disk for magnetic transfer according to claim 1, wherein the thickness t2 of the first plated layer is one to one-half times of the thickness t1 of the conductive layer.

4. The method for manufacturing a master disk for magnetic transfer according to claim 2, wherein the thickness t2 of the first plated layer is one to one-half times of the thickness t1 of the conductive layer.

5. The method for manufacturing a master disk for magnetic transfer according to claim 1, wherein the thickness t3 of the second plated layer is 100 to 300 μm.

6. The method for manufacturing a master disk for magnetic transfer according to claim 2, wherein the thickness t3 of the second plated layer is 100 to 300 μm.

7. The method for manufacturing a master disk for magnetic transfer according to claim 3, wherein the thickness t3 of the second plated layer is 100 to 300 μm.

8. The method for manufacturing a master disk for magnetic transfer according to claim 4, wherein the thickness t3 of the second plated layer is 100 to 300 μm.

9. The method for manufacturing a master disk for magnetic transfer according to claim 1, wherein the first plated layer and/or the second plated layer is formed of a Ni-based metal.

10. The method for manufacturing a master disk for magnetic transfer according to claim 2, wherein the first plated layer and/or the second plated layer is formed of a Ni-based metal.

11. The method for manufacturing a master disk for magnetic transfer according to claim 3, wherein the first plated layer and/or the second plated layer is formed of a Ni-based metal.

12. The method for manufacturing a master disk for magnetic transfer according to claim 4, wherein the first plated layer and/or the second plated layer is formed of a Ni-based metal.

13. The method for manufacturing a master disk for magnetic transfer according to claim 5, wherein the first plated layer and/or the second plated layer is formed of a Ni-based metal.

14. The method for manufacturing a master disk for magnetic transfer according to claim 6, wherein the first plated layer and/or the second plated layer is formed of a Ni-based metal.

15. The method for manufacturing a master disk for magnetic transfer according to claim 7, wherein the first plated layer and/or the second plated layer is formed of a Ni-based metal.

16. The method for manufacturing a master disk for magnetic transfer according to claim 8, wherein the first plated layer and/or the second plated layer is formed of a Ni-based metal.

17. The method for manufacturing a master disk for magnetic transfer according to claim 1, wherein the conductive layer is formed by sputtering.

18. The method for manufacturing a master disk for magnetic transfer according to claim 2, wherein the conductive layer is formed by sputtering.

19. The method for manufacturing a master disk for magnetic transfer according to claim 3, wherein the conductive layer is formed by sputtering.

20. The method for manufacturing a master disk for magnetic transfer according to claim 4, wherein the conductive layer is formed by sputtering.

21. The method for manufacturing a master disk for magnetic transfer according to claim 5, wherein the conductive layer is formed by sputtering.

22. The method for manufacturing a master disk for magnetic transfer according to claim 6, wherein the conductive layer is formed by sputtering.

23. The method for manufacturing a master disk for magnetic transfer according to claim 7, wherein the conductive layer is formed by sputtering.

24. The method for manufacturing a master disk for magnetic transfer according to claim 8, wherein the conductive layer is formed by sputtering.

25. The method for manufacturing a master disk for magnetic transfer according to claim 9, wherein the conductive layer is formed by sputtering.

26. The method for manufacturing a master disk for magnetic transfer according to claim 10, wherein the conductive layer is formed by sputtering.

27. The method for manufacturing a master disk for magnetic transfer according to claim 11, wherein the conductive layer is formed by sputtering.

28. The method for manufacturing a master disk for magnetic transfer according to claim 12, wherein the conductive layer is formed by sputtering.

29. The method for manufacturing a master disk for magnetic transfer according to claim 13, wherein the conductive layer is formed by sputtering.

30. The method for manufacturing a master disk for magnetic transfer according to claim 14, wherein the conductive layer is formed by sputtering.

31. The method for manufacturing a master disk for magnetic transfer according to claim 15, wherein the conductive layer is formed by sputtering.

32. The method for manufacturing a master disk for magnetic transfer according to claim 16, wherein the conductive layer is formed by sputtering.

* * * * *